United States Patent
Kurtz et al.

(10) Patent No.: US 7,331,241 B1
(45) Date of Patent: Feb. 19, 2008

(54) LOW COST PRESSURE SENSOR FOR MEASURING OXYGEN PRESSURE

(75) Inventors: Anthony D. Kurtz, Saddle River, NJ (US); Scott Goodman, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/508,089

(22) Filed: Aug. 22, 2006

(51) Int. Cl.
*G01L 9/00* (2006.01)

(52) U.S. Cl. .............................. 73/753; 73/754; 73/756

(58) Field of Classification Search .......... 73/700–756; 361/283.1–283.4
See application file for complete search history.

(56) References Cited

U.S. PATENT DOCUMENTS

| | | | |
|---|---|---|---|
| 4,359,498 A | 11/1982 | Mallon et al. | |
| 4,406,992 A | 9/1983 | Kurtz et al. | |
| 4,456,901 A | 6/1984 | Kurtz et al. | |
| 4,481,497 A | 11/1984 | Kurtz et al. | |
| 4,510,671 A | 4/1985 | Kurtz et al. | |
| 4,672,654 A | 6/1987 | Vanacore | |
| 4,814,845 A | 3/1989 | Kurtz | |
| 4,814,856 A | 3/1989 | Kurtz et al. | |
| 4,899,125 A | 2/1990 | Kurtz | |
| 5,002,901 A | 3/1991 | Kurtz et al. | |
| 5,165,283 A | 11/1992 | Kurtz et al. | |
| 5,286,671 A | 2/1994 | Kurtz et al. | |
| 5,298,767 A | 3/1994 | Shor et al. | |
| 5,303,594 A | 4/1994 | Kurtz et al. | |
| 5,376,241 A | 12/1994 | Shor et al. | |
| 5,386,142 A | 1/1995 | Kurtz et al. | |
| 5,387,803 A | 2/1995 | Kurtz et al. | |
| 5,401,672 A | 3/1995 | Kurtz et al. | |
| 5,425,841 A | 6/1995 | Kurtz et al. | |
| 5,454,915 A | 10/1995 | Shor et al. | |

(Continued)

FOREIGN PATENT DOCUMENTS

CN 1933699 A * 3/2007

*Primary Examiner*—Andre J. Allen
*Assistant Examiner*—Jermaine Jenkins
(74) *Attorney, Agent, or Firm*—Plevy Howard, PC

(57) ABSTRACT

A low cost sensor assembly for measuring oxygen pressures contains a transistor header. The transistor header has terminal pins extending therefrom. The transistor header co-acts with a first circuit insulator board. The first circuit board has deposited thereon four hand mirror shaped contact areas each one associated with one of the terminal pins of the transistor header. The top portion of each contact areas has an aperture with the extending arm of the area directed towards the center of the board. The board is epoxied to the transistor header with the terminal pins of the header extending into the apertures of the contact board. A second contact board is then epoxied to the first contact board. The second contact board has a series of four apertures located at the center. Each of the apertures of the second board contacts the handle portion of the mirror patterns of the first board. A leadless piezoresistor sensor assembly is then positioned and secured to the second board whereby the terminals from the sensor assembly align with each of the apertures in the second board. The terminals of the sensor assembly are apertures filled with a conductive glass metal frit and each filled aperture makes contact with a terminal of the sensor. The configuration has all conductive terminals of the entire device completely isolated and insulated from the oxygen environment, thus preventing ignition of the oxygen.

10 Claims, 4 Drawing Sheets

U.S. PATENT DOCUMENTS

| | | | |
|---|---|---|---|
| 5,455,445 A | 10/1995 | Kurtz et al. | |
| 5,461,001 A | 10/1995 | Kurtz et al. | |
| 5,473,944 A | 12/1995 | Kurtz et al. | |
| 5,539,236 A | 7/1996 | Kurtz et al. | |
| 5,543,349 A | 8/1996 | Kurtz et al. | |
| 5,569,932 A | 10/1996 | Shor et al. | |
| 5,574,295 A | 11/1996 | Kurtz et al. | |
| 5,587,601 A | 12/1996 | Kurtz | |
| 5,597,738 A | 1/1997 | Kurtz et al. | |
| 5,614,678 A | 3/1997 | Kurtz et al. | |
| 5,702,619 A | 12/1997 | Kurtz et al. | |
| 5,789,793 A | 8/1998 | Kurtz et al. | |
| 5,891,751 A | 4/1999 | Kurtz et al. | |
| 5,955,771 A | 9/1999 | Kurtz et al. | |
| 5,973,590 A | 10/1999 | Kurtz et al. | |
| 6,176,137 B1 * | 1/2001 | Sasaki et al. | 73/754 |
| 6,210,989 B1 | 4/2001 | Kurtz et al. | |
| 6,229,427 B1 | 5/2001 | Kurtz et al. | |
| 6,235,611 B1 | 5/2001 | Kurtz et al. | |
| 6,272,928 B1 | 8/2001 | Kurtz | |
| 6,293,154 B1 | 9/2001 | Kurtz | |
| 6,326,682 B1 | 12/2001 | Kurtz et al. | |
| 6,327,911 B1 | 12/2001 | Kurtz et al. | |
| 6,330,829 B1 | 12/2001 | Kurtz et al. | |
| 6,363,792 B1 | 4/2002 | Kurtz et al. | |
| 6,424,017 B2 | 7/2002 | Kurtz et al. | |
| 6,457,368 B1 * | 10/2002 | Sasaki et al. | 73/753 |
| 6,523,415 B2 | 2/2003 | Kurtz et al. | |
| 6,530,282 B1 | 3/2003 | Kurtz et al. | |
| 6,543,291 B1 | 4/2003 | Kurtz et al. | |
| 6,543,293 B1 | 4/2003 | Kurtz et al. | |
| 6,564,644 B1 | 5/2003 | Kurtz | |
| 6,591,686 B1 | 7/2003 | Kurtz | |
| 6,595,066 B1 | 7/2003 | Kurtz et al. | |
| 6,612,178 B1 | 9/2003 | Kurtz et al. | |
| 6,612,179 B1 | 9/2003 | Kurtz | |
| 6,612,180 B1 | 9/2003 | Kurtz | |
| 6,642,594 B2 | 11/2003 | Kurtz | |
| 6,688,182 B2 | 2/2004 | Kurtz et al. | |
| 6,689,669 B2 | 2/2004 | Kurtz et al. | |
| 6,691,581 B2 | 2/2004 | Kurtz et al. | |
| 6,700,473 B2 | 3/2004 | Kurtz et al. | |
| 6,727,524 B2 | 4/2004 | Kurtz | |
| 6,848,307 B1 | 2/2005 | Kurtz et al. | |
| 6,861,276 B2 | 3/2005 | Kurtz | |
| 6,871,487 B2 | 3/2005 | Kurtz et al. | |
| 6,891,711 B1 | 5/2005 | Kurtz | |
| 6,895,822 B2 | 5/2005 | Kurtz et al. | |
| 7,057,247 B2 | 6/2006 | Kurtz et al. | |
| 7,107,853 B2 | 9/2006 | Kurtz | |
| 7,107,856 B2 * | 9/2006 | Kopp | 73/756 |
| 7,124,639 B1 | 10/2006 | Kurtz et al. | |

* cited by examiner

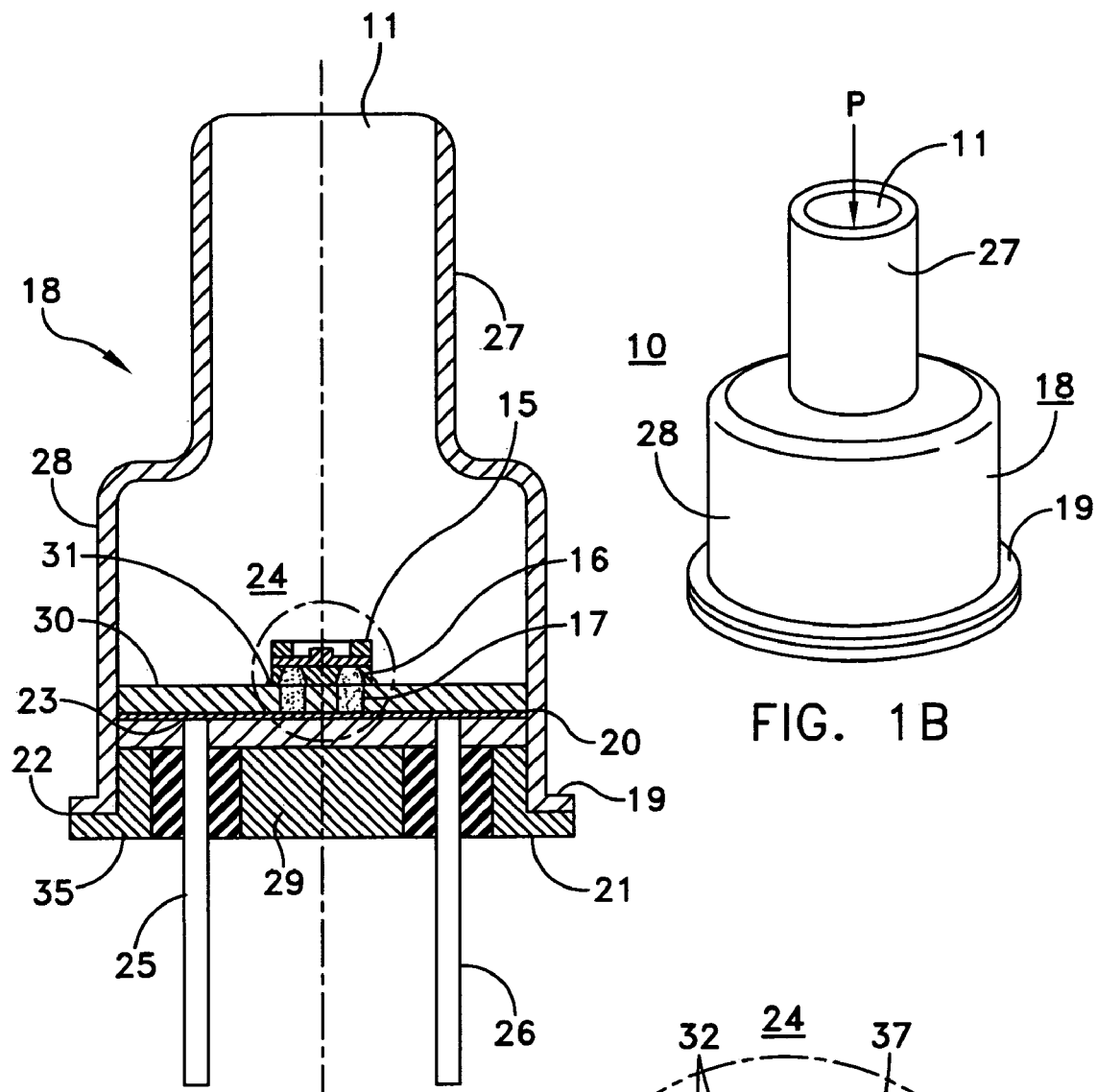
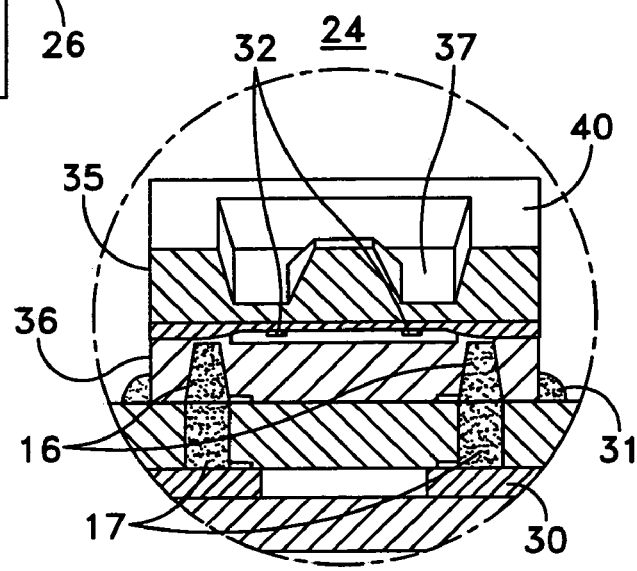
FIG. 1A
FIG. 1B
FIG. 2

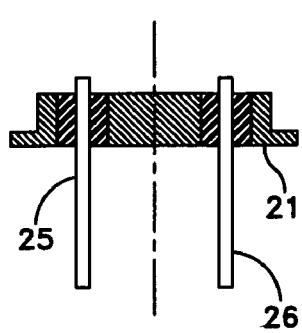 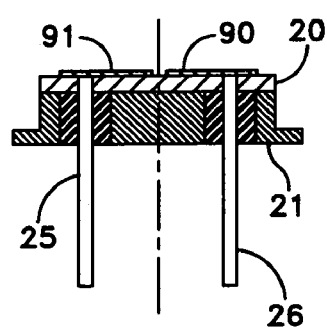 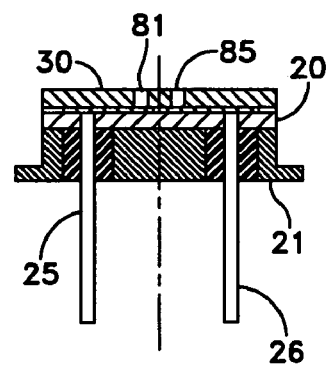
FIG. 7A   FIG. 7B   FIG. 7C
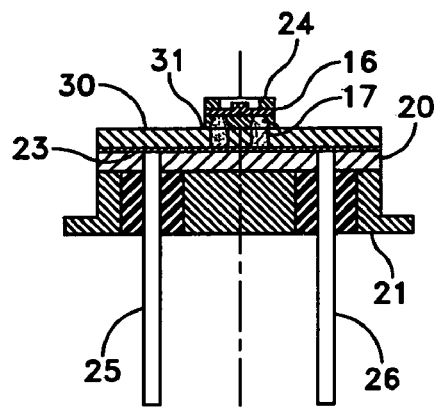
FIG. 7D
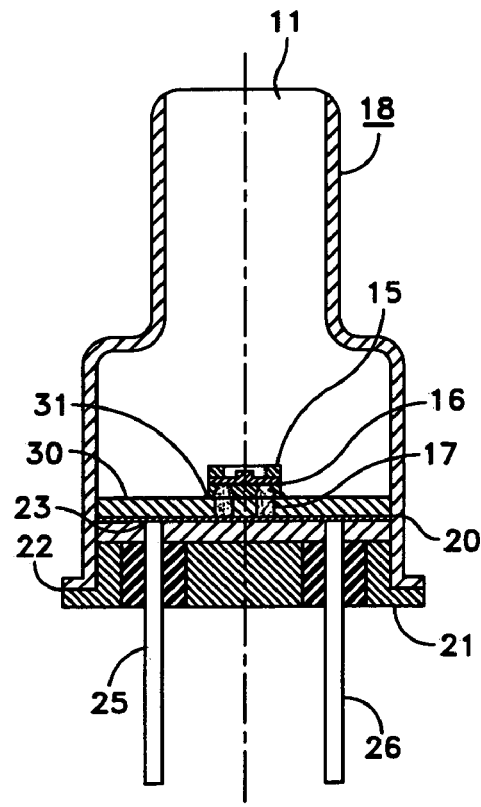
FIG. 7E

LOW COST PRESSURE SENSOR FOR MEASURING OXYGEN PRESSURE

FIELD OF THE INVENTION

This invention relates to pressure sensors in general and more particularly to a low cost pressure sensor for measuring oxygen pressure and methods of fabricating the same.

BACKGROUND OF THE INVENTION

Pressure transducers are utilized and employed in a wide variety of applications. One application for the use of a pressure transducer involves measuring oxygen pressures. In aircraft or in other environments oxygen masks are employed in dangerous situations. The oxygen masks can be released and used by a passenger in the event of a technical breakdown whereby the aircraft may lose pressure or in other situations. In employing such devices, one must measure the actual pressure of the oxygen as it enters each mask. One can monitor the entire pressure of the oxygen on the aircraft, but this would not be sufficient and it is preferable that one measure the pressure of the oxygen at each mask. In this manner one can be assured that the proper pressure is being furnished together with the oxygen. In many such devices, the oxygen instead of flowing continuously, is basically pulsed and therefore bursts of oxygen are sent at predetermined repetitive intervals. In this manner, the average pressure imparted to the oxygen mask should be known and therefore a pressure transducer or a sensor is employed in order give an accurate measure of the pressure supplied to the mask. If the pressure is not adequate, a warning light or other indication can be provided indicating that the passenger should use another mask or use other facilities.

The aspect of monitoring oxygen pressure in an aircraft or other environment is very desirable. It may also be desirable to measure oxygen pressure in other types of oxygen devices such as in hospital environments and so on where oxygen is also supplied to a patient or other user. As one can ascertain, measuring the pressure of oxygen creates certain problems. Any transducer utilized in such an environment must be capable of being cleaned to remove Organic materials and to have no electrical current carrying members in contact with the oxygen. As one can ascertain, any spark or exposure to electrical current can ignite the oxygen thus leading to a disaster. A pressure transducer utilized in such environments must be fabricated to prevent the above-noted problems. It is a further desire to provide such a pressure transducer at low cost due to the large number of transducers that are employed in an aircraft having a large number of passenger seats and positions.

SUMMARY OF THE INVENTION

A pressure transducer, comprising a header having a top and bottom surface and having a plurality of terminal pins extending from the top surface to the bottom surface, a first circuit board having a top and bottom surface with the bottom surface, positioned on the top surface of the header, the first board having one aperture for each of the terminal pins located on the top surface with the associated aperture surrounding the associated pin, each of the apertures surrounded by a contact area with each contact area having an extending conductive arm directed toward the center of the board, a second circuit board having a top and bottom surface with the bottom surface positioned on the top surface of the first board, the second board having a plurality of apertures located about the center of the second board and with each aperture positioned to overlie an associated conductive arm of the first board, a pressure sensor having an array of pressure responsive devices located thereon and having a top surface for receiving a pressure and a bottom surface positioned on the second board about the center thereof, the bottom surface having terminal pads associated with the array with each pad overlying an associated aperture of the second board, a conductive material deposited in the apertures of the second board to enable conductive contact to the terminal pads of the sensor the conductive material in each aperture contacting the associated extending conductive arm to thereby electrically connect each sensor pad to each of the header terminal pins.

BRIEF DESCRIPTION OF THE FIGURES

FIG. 1 is a cross-sectional view of the pressure transducer for measuring oxygen according to an embodiment of the invention.

FIG. 2 is a cross-sectional view of a sensor employed in conjunction with an embodiment of the invention.

FIGS. 7A-7E depicts the various steps utilized in fabricating a pressure transducer according to an embodiment of the invention.

DETAILED DESCRIPTION OF THE INVENTION

Figure 3A:
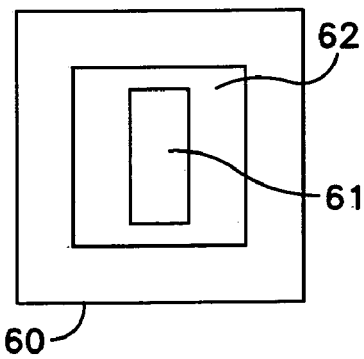
FIG. 3 consists of FIGS. 3A, 3B and 3C which respectively show a sensor diaphragm, a cross-sectional view of the sensor and a top-view of the piezoresistive elements found on a sensor.

Referring to FIG. 1 and particularly to FIG. 1A there is shown a cross-sectional view of a low cost pressure sensor 10 particularly adapted for measuring oxygen pressures. The pressure sensor 10 has a metallic can 18 which basically has a tubulation portion 27 extending to a greater diameter portion 28. The portion 28 has an extending flange 19. The metallic can 10 as seen in FIG. 1A has a bottle shape having the tubulation or neck 27 which typically is on the order of a quarter of an inch in length and one-eighth of an inch in diameter. The top opening 11 serves as a pressure port for receiving oxygen pressure. The larger diameter portion 28 surrounds the pressure sensor 24 and is secured to a transistor header 21. A perspective view of the metallic can 18 is shown in FIG. 1B.

The transistor header 21 is a typical transistor header and has a metal base portion 29 which has extending terminal pins 25 and 26. Such transistor headers are well known and for example a TO5 header or a TO8 header can be used for header 21. Such headers typically have at least four pins as 25 and 26. Typically the metal can 18 is discharge welded via flange 19 to the header flange 35. The header 21 has mounted on the top surface thereof a first circuit board or an insulative substrate 20. The board 20 has apertures into which the pins as 25 and 26 extend. The board is mounted and secured to the top surface of the transistor header with an epoxy material. Such epoxy materials are well known. Positioned on board 20 is a second board 30 which is mounted and secured to board 20 with an epoxy bond. As will be explained, both the circuit board 20 and circuit board 30 have apertures for accommodating the pins of the transistor header as pins 25 and 26, which pins eventually will be connected to the outputs of the piezoresistive sensor. The piezoresistive sensor is depicted in FIG. 1A by reference numeral 24. Essentially the sensor is a leadless sensor as the type available from Kulite Semiconductor, the assignee herein. The leadless sensor 24 is mounted and secured to board 30 by an epoxy bond. There is also a layer of epoxy 31 which surrounds the peripheral edge of the sensor. The sensor contains a glass metal frit 16 which frit contacts the terminal pads of the sensor. A conductive epoxy 17 enables one to make contact with the terminal pins 25 and 26 of the transistor header 21.

A more detailed view of a typical piezoresistive sensor 24 is shown in FIG. 2. As seen the piezoresistive sensor has p-type monocrystalline silicon piezoresistors 32. The piezoresistors 32 are formed on a sensor wafer 35, which for example may be a wafer of silicon. The entire structure, as indicated, is secured to the top surface of the board 30 by means of an epoxy. The epoxy also forms a surrounding peripheral band 31 about the sensor element 24. The sensor element includes a glass contact wafer 36 which is bonded to the silicon wafer 35. There are terminal apertures as depicted which are filled with a conductive glass metal frit 16. Glass metal frits are conductive and essentially enable one to make contact to the piezoresistors located on the silicon wafer as is known. The entire sensor 24 is bonded to the board 30 by means of an epoxy bond. An epoxy 17 is a conductive epoxy and therefore makes contact to the metal glass frits as contained in the semiconductor wafer. The epoxy 17 fills the apertures of board 30 and makes contact with the contact pads of the sensor 24.

The above-noted wafer depicted in FIG. 2 essentially is referred to as a leadless dielectrically isolated sensor chip. The assignee herein has a number of patents which fully describe such a sensor. For example, reference is made to U.S. Pat. No. 5,973,590 entitled "Ultra-Thin Surface Mount Wafer Sensor Structures and Methods of Fabricating the Same", issued on Oct. 26, 1999 to A. D. Kurtz et al and assigned to the assignee herein. That patent depicts a sensor chip which may be employed as the chip of FIG. 2. For example, reference is made to FIG. 10 of the above-noted patent which shows a suitable sensing structure which may be employed for the sensor depicted in FIG. 2. Reference is also made to U.S. Pat. No. 6,210,989 which is a divisional of the above-noted patent and which issued on Apr. 3, 2001 having the same title as indicated above and also assigned to the assignee herein. Both patents disclose semiconductor sensor devices which include a semiconductor diaphragm member which is depicted in FIG. 2. The recesses as 37 which form an active area for the entire transducer which active area functions as a diaphragm and deflects upon application of a force to the sensor 24.

Also surrounding the transducer is a top-ring member 40 which is secured to the sensor structure by conventional means. In any event, as one can ascertain the sensor of FIG. 2 as further noted in the above-noted patents contain four piezoresistors which are connected in a Wheatstone bridge configuration. The Wheatstone bridge has four terminals which are directed via the associated glass metallic frit contacts 16 to the conductive epoxy terminals 17 and eventually come into contact with terminal pins such as 25 and 26 of the transistor header 21. This therefore enables one to provide an output for the Wheatstone bridge as well as providing a biasing to the bridge. This is conventional and as one can see from the above-noted patents, which are incorporated herein, the devices are referred to as leadless sensing devices because of the fact that there are no wires directed from the devices. The means of making connections to the devices reside in the apertures which contain the glass metal frit which are conductive frits as well as the conductive epoxies which direct the terminals of the Wheatstone bridge to the output connector of the device. FIG. 1B shows a perspective view of the metal can 18 depicted in FIG. 1A showing the tubular portion 27 which has the pressure port 11 at the top end and which as shown in FIG. 1A extends into portion 28 which has the flange 19 which is welded to the corresponding flange 35 of the transistor header 21 by a discharge weld 22.

Figure 3B:
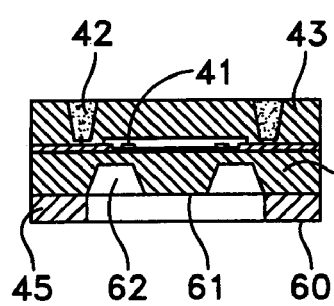
Figure 3C:
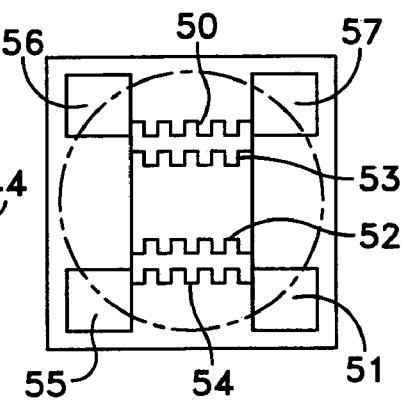

Referring to FIG. 3 there is shown in FIG. 3A a top view of the semiconductor sensor depicted in FIG. 1A. The semiconductor sensor 24 has a central boss 61 which acts as a stop. Surrounding the boss 61 are thinned areas as recesses 62. These thinned areas will deflect upon application of a force to the device. These areas are known as the active area as compared to, for example, area 60 which is a peripheral area known as the inactive area. As seen in FIG. 3B a glass wafer or other device is mounted to the silicon wafer 44 by means of a fusion bond. The glass wafer 60 is an insulating wafer and is used for mounting purposes. As seen in FIG. 3B the piezoresistors 41 are shown as well as the glass frit filled apertures 42. The apertures 42 are filled with a conductive metal glass frit and the metal glass frit makes contact to the terminals of the Wheatstone bridge as fully described in the above-noted patents. FIG. 3C shows four piezoresistor sensors as 50, 52, 53 and 54 connected to associated terminal pads as 51 and 57 to form a Wheatstone bridge. FIG. 3C is taken from FIG. 3B with the wafer 43 omitted and looking down on the piezoresistive sensors. Typically shown, the sensors as 50, 52, 53 and 54 are serpentine and operate to vary resistance upon application of an applied force to the device. The applied force is applied via the pressure port 11 which is the top open surface of the tubular portion of the metallic can 18. This is shown in FIG. 1B where pressure (P) is applied to the aperture 11 which is the pressure port.

Figure 4:
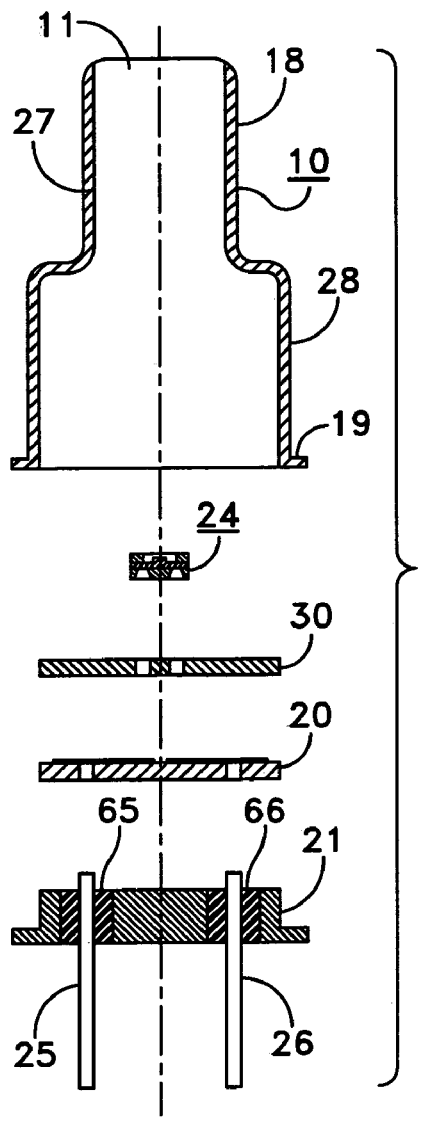
FIG. 4 is a cross-sectional perspective exploded view showing each individual part of the sensor depicted in FIG. 1.

Referring to FIG. 4 there is shown an exploded cross-sectional view of the various components depicted in FIG. 1 prior to installing the same. Thus there is shown the metal can 18 having the tubular portion 27 with a pressure port 11 defined by the top open surface. The tubular portion 27 is narrower than the end portion 28 which terminates in an extending flange 19. It is noted that the can as depicted in FIGS. 1 and 4 essentially appears like a cross section of a typical bottle where the neck of the bottle is depicted by reference numeral 27 and the body of the bottle by reference numeral 28. There is shown the chip 24 prior to being mounted on the board 30, which board 30 as indicated, is mounted on board 20. The transistor header 21 is shown with pins 25 and 26 emanating therefrom. The pins typically as 25 and 26 are secured to the metallic header 21 by means of glass enclosures as for example, 65 and 66. Pins may be secured to the transistor header by other means.

Figure 5A:
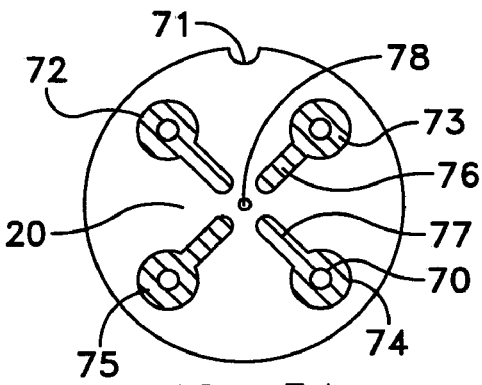
FIG. 5 consists of FIGS. 5A and 5B which respectively show a top-view of a circuit board and a cross-sectional view of the same circuit board used in an embodiment of the invention.
Figure 5B:
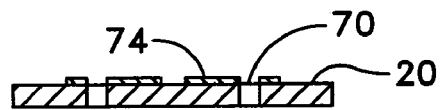

Referring to FIG. 5A in conjunction with FIG. 5B, there is shown a depiction of the board 20. As seen the board 20 has an alignment notch 71. The board also contains four terminal copper-plated areas as 72, 73, 74 and 75. Each area has a central aperture as aperture 70 associated with area 74.

The board 20 is typically fabricated from an insulating material such as a Kapton or a ceramic or other insulating material. The areas as for example 72, 73, 74 and 75 are copper-gold-plated areas and are formed on the board by means of photolithographic techniques. Such techniques are well known in the semiconductor art. As seen the four pads, each appear as a hand mirror configuration with a central aperture 70. The arms of the mirror as 76 and 77 extend towards the center 78 of the board 20. The board thickness 20 is typically 0.3 inches thick where the apertures are typically 0.02 inches and are equally spaced on the board 20. The board as indicated is metallized by typical techniques and preferably the board is fabricated from Kapton or a ceramic material such as alumina or some other suitable material. FIG. 5B shows a cross-section of the board showing the through aperture 70 each associated with the hand mirror like contact pads as 72, 73, 74 and 75.

Figure 6A:
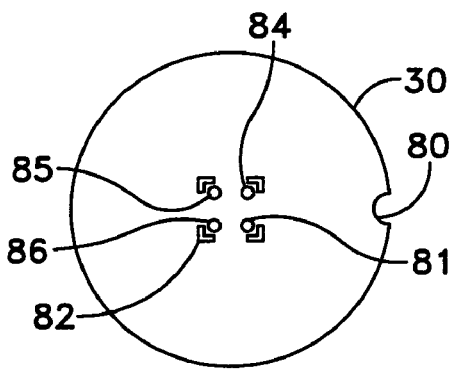
FIGS. 6A and 6B show a top-plan view and a cross-sectional view, respectively, of another circuit board used in an embodiment of the invention.
Figure 6B:
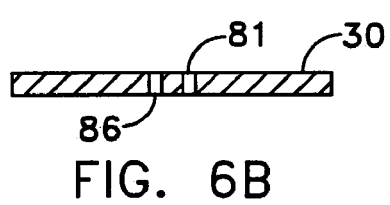

Referring to FIG. 6A there is shown a top-plan view of the board 30 which also has an alignment notch 80. The board 30 contains apertures as 81, 84, 85 and 86 with each aperture bounded by a L-shaped mark 82. The apertures 81 are shown more clearly in the cross-sectional view depicted in FIG. 6B. The L-shaped members as 82 are alignment marks to enable a proper positioning of the sensor structure 24 on the board 30. The board has four apertures (81, 84, 85, and 86) which are in one embodiment, basically 0.015 inches in diameter. These are through holes and are equally spaced. These apertures will accommodate the suitable terminals of the sensor element 24. The board 20 accommodates the terminal pins from the transistor header as pins 25 and 26 (FIG. 4). This is also clearly depicted in FIG. 1A where the pins extend through the apertures as 70. The elongated arms 76 and 77 (FIG. 5A) associated with each of the pad areas overlie the apertures as 81 and 82 of the board 30 when boards 20 and 30 are positioned as shown. These apertures are filled with the conductive epoxy 17. Therefore, the conductive epoxy 17 which fills the apertures as 81, 82 makes contact to the terminals of the sensor chip as for example those terminals which are filled with the glass metal frit 16. Thus, the terminals filled with the glass metal frit 16 make contact with the conductive filled apertures 81, 84 and 85. The conductive epoxy 17 makes contact with the elongated ends 76 and 77 of the hand mirror shaped terminal pads 72, 73, 74 and 75 of FIG. 5A. The apertures of terminal board 20 accommodate contact with the pins 25 and 26 of the transistor header. Thus, circuit boards 20 and 30 interface with the sensor chip enabling one to contact each of the terminals of the Wheatstone bridge array which is located on the sensor chip. All the terminals which emanate from the sensor are completely surrounded and enclosed and make no contact with the oxygen environment. This therefore provides a sensor structure which is completely isolated from the environment and if any spark occurs it cannot be directed to the oxygen environment because of the way the sensor is mounted and isolated in the assembly. It is seen that the conductive epoxy terminals as 17 are all surrounded by the board 20 and 30 while the glass metal frit contacts as 16 associated with the sensor are all surrounded by the glass contact wafer of the sensor. It is thus seen that the entire sensor and all electrical carrying leads are totally isolated in the configuration and contact is made as described above via the circuit boards 20 and 30 depicted respectively in FIG. 5 and FIG. 6.

Referring to FIG. 7 there is shown a typical assembly procedure for fabricating the above-noted device. FIG. 7A depicts the first step in the process where a transistor header 21 having terminal pins 25 and 26 is first shown. The transistor header as indicated above may be a TO5 header or a TO8 header or any transistor header. While two pins 25 and 26 are shown it is noted that there are at least four pins associated with a typical transistor header. As indicated the pins as 25 and 26 will eventually contact the terminal pads of the semiconductor sensor wafer 24. Referring to FIG. 7B there is shown a second step in the process where the board 20 is now mounted to the transistor header by means of an epoxy bond. Also shown in this second step are conductive epoxy areas as 90 and 91. The conductive epoxy areas 90 and 91 are employed to make contact with the hand mirror like conductive areas 72 and 73 (FIG. 5A). Therefore, the conductive areas assure that terminal pins 25 and 26 for example are all conductively connected via the aperture 70 to the circuit board 20. FIG. 7C depicts a third step in the process, where the circuit board 30 having apertures 81 and 85 is placed upon the circuit board 20. The circuit board 30 is again mounted on circuit board 20 with a suitable epoxy. The apertures 81 and 85 are shown. FIG. 7D depicts a fourth step in the process. In step 4, apertures 81 and 85 associated with circuit board 30 are filled with a conductive epoxy 17. The sensor 24 is placed thereon having its apertures filled with a glass metal frit 16. The glass metal frit 16 makes contact with the conductive epoxy 17 which in turn makes contact with the extending arms 76, 77 associated with the hand mirror like terminal pads 72, 73, 74 and 75 of board 20, thereby enabling the four terminals of the Wheatstone bridge on the sensor wafer to be connected to an associated terminal pin as 25 and 26 of the transistor header 21. Step 5 shows the final assembly where the can 18 is now welded to the extending flange 35 of the transistor header 21 via a weld 22. As one can ascertain, FIG. 7E shows the final transducer structure depicting boards 20 and 30 and depicting the pressure port 11 associated with the tubular portion of the metal can 18.

Figure 8:
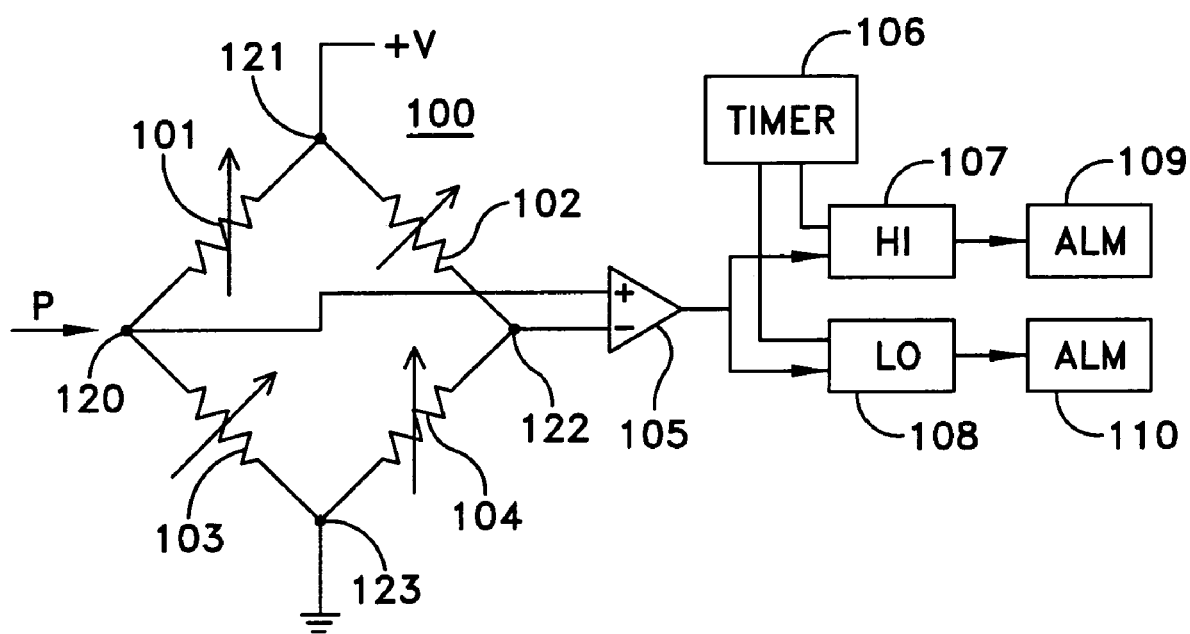
FIG. 8 is a schematic circuit diagram of an oxygen pressure sensor and associated alarm circuitry.

Referring to FIG. 8 there is shown a simple circuit diagram depicting one use of an oxygen pressure sensor according to an embodiment of this invention. As seen in FIG. 1 reference numeral 100 depicts a Wheatstone bridge having piezoresistors 101, 102, 103 and 104. This Wheatstone bridge array is the same array as would be fabricated on sensor chip 24 shown in FIG. 1A and FIG. 2. As indicated, each of the sensors as 101, 102, 103 and 104 is a piezoresistive sensor and located on the semiconductor wafer 24. The piezoresistive sensors may be p-type monocrystalline silicon piezoresistors for example. The Wheatstone bridge array as shown in FIG. 8 is the typical array which is found on the sensor wafer as 24 of FIG. 1. The terminals as shown for example as terminals 120, 121, 122 and 123 are the four terminals of the Wheatstone bridge which eventually connect and are directed to the terminal pins of the transistor header. The output of the Wheatstone bridge is directed to an operational amplifier 105 which produces an amplified version of the voltage. When a pressure (P) is applied to the sensor array, the sensors which are positioned on the active area of the diaphragm change resistance as the diaphragm deflects. In this manner, the output voltage is a direct indication of the magnitude of pressure. For an oxygen pressure sensor the output of operational amplifier is directed to a high pressure detector/monitor module 107 and a low module 108. Each module may be associated with a timer 106. The function of modules 107 and 108 is to determine whether the pressure as applied to the Wheatstone bridge is within desirable limits. If the pressure is too low, the pressure monitor 108 will recognize the low voltage and if it maintains low for a predetermined period as determined by timer 106 an alarm 110 will be sounded. The alarm 110 may be a visual alarm such as a light or other indicator and may be located in the cockpit of the plane or at some other remote location. In a similar manner, if the pressure is too high, this will be detected by the high pressure detector 107 and if the pressure remains too high for a predetermined period determined by timer 106 then a high pressure alarm 109 will be activated. It is understood that the monitoring of the Wheatstone bridge can be implemented by means of a microprocessor and a suitable program can be written regarding the same. FIG. 8 is merely included to show that the pressure sensor 100 which is monitoring the pressure of oxygen in an environment is associated normally with circuitry to determine whether or not the pressure operates within suitable limits. The circuit of FIG. 8 is merely by way of an example and not intended to be limiting in any respect. It is also again indicated that the oxygen pressure sensor as described above is utilized in the circuit 100 and essentially the main aspect and purpose of the sensor is to assure that there can be no electrical contact with the oxygen environment. Therefore, any current carrying lead or any electrical arc will not be propagated to the oxygen environment because of the structure of the pressure transducer. Again, as shown, one has provided a sensor for measuring pressure in an oxygen environment where all active or current/voltage carrying terminals are completely isolated from the oxygen environment by means of insulating materials as ceramic, Kapton or insulating epoxy. These materials as employed such as Kapton, ceramic and the epoxies are highly insulating materials and therefore the danger of any electrical contact being made with the oxygen environment is totally minimized. It is also seen that the sensor is simple to construct and extremely reliable.

Thus, it should be apparent to one skilled in the art that there may be alternative configurations and alternate embodiments which may be employed. These include the substitution of different materials. For example the use of glass or glass seals in lieu of epoxy and use of other conductive materials in lieu of conductive epoxy or glass metal conductive frit-like materials are envisioned.

All such modifications and alterations should be apparent to those skilled in the art and all such configurations are deemed to be encompassed within the spirit and scope of the claims appended hereto.

What is claimed is:

1. A pressure transducer, comprising:
   a header having a top and bottom surface and having a plurality of terminal pins extending from said top surface to said bottom surface,
   a first circuit board having a top and bottom surface, with said bottom surface positioned on said top surface of said header, said first board having one aperture for each of said terminal pins located on said top surface with said associated aperture surrounding said associated pin, each of said apertures surrounded by a contact area with each contact area having an extending conductive arm directed toward the center of said board,
   a second circuit board having a top and bottom surface, with said bottom surface positioned on the top surface of said first board, said second board having a plurality of apertures located about the center of said second board and with each aperture positioned to overlie an associated conductive arm of said first board,
   a pressure sensor having an array of pressure responsive devices located thereon and having a top surface for receiving a pressure and a bottom surface positioned on said second board about the center thereof, said bottom surface having terminal pads associated with said array with each pad overlying an associated aperture of said second board,
   a conductive material deposited in said apertures of said second board to enable conductive contact to said terminal pads of said sensor said conductive material in each aperture contacting said associated extending conductive arm to thereby electrically connect each sensor pad to each of said header terminal pins.

2. The pressure transducer according to claim 1, further including a tubular member having a top and a bottom opening, with said bottom opening positioned about the periphery of said header, with said top opening serving as a pressure port to enable a pressure to be monitored to be applied to said pressure sensor.

3. The pressure transducer according to claim 2, wherein said tubular member has a top narrow tubular section extending to a larger bottom tubular section, with said bottom tubular section secured at the periphery to said header.

4. The pressure transducer according to claim 1, wherein said header is a transistor header selected as TO5 or TO8 header.

5. The pressure transducer according to claim 1, wherein said first circuit board is fabricated from an insulating material, with said first circuit board secured to said top surface of said header by an epoxy bond.

6. The pressure transducer according to claim 1, wherein said second circuit board is fabricated from an insulating material, with said second circuit board secured to said first circuit board by an epoxy bond.

7. The pressure transducer according to claim 1, wherein said pressure sensor is a semiconductor pressure sensor chip having four piezoresistive elements mounted on an active area of said sensor and arranged in a Wheatstone bridge array with each terminal of said bridge directed to an associated terminal pad of said sensor, said sensor having said piezoresistors dielectrically isolated with said chip being secured to said second circuit board by an epoxy bond.

8. The pressure transducer according to claim 7, wherein said piezoresistive elements are p-type monocrystalline silicon piezoresistors.

9. The pressure transducer according to claim 1, wherein said conductive material is a conductive epoxy.

10. The pressure transducer according to claim 1, wherein said pressure to be monitored is the pressure provided by a source of oxygen.

* * * * *